United States Patent [19]

Kuriyama et al.

[11] Patent Number: 4,510,186
[45] Date of Patent: Apr. 9, 1985

[54] PROCESS FOR PREPARING A POROUS SHEET MATERIAL

[75] Inventors: Katsumi Kuriyama, Koshigaya; Isao Kondō, Ageo; Iwao Misaizu, Kawaguchi, all of Japan

[73] Assignees: Dainichi Seika Color & Chemicals Mfg. Co., Ltd.; Ukima Colour & Chemicals Mfg. Co., Ltd., both of Tokyo, Japan

[21] Appl. No.: 517,437

[22] Filed: Jul. 26, 1983

[30] Foreign Application Priority Data

Apr. 3, 1982 [JP] Japan .................................. 57-67239

[51] Int. Cl.³ ............................................... B05D 3/02
[52] U.S. Cl. ..................................... 427/381; 427/245; 427/385.5; 427/389.9; 428/423.1; 428/904
[58] Field of Search ...................... 427/245, 385.5, 389, 427/381, 389.9; 428/423.1, 904

[56] References Cited

U.S. PATENT DOCUMENTS 3,418,198 12/1968 Einstman .......................... 427/245 X
3,546,001 12/1970 Giannone et al. ................... 427/245
3,582,396 6/1971 König et al. ......................... 427/245
4,233,359 11/1980 Mimura et al. ............... 427/389.9 X

FOREIGN PATENT DOCUMENTS 1294711 11/1972 United Kingdom .
1501244 2/1978 United Kingdom .
2009192 6/1979 United Kingdom .

Primary Examiner—Michael R. Lusignan
Attorney, Agent, or Firm—Oblon, Fisher, Spivak, McClelland & Maier

[57] ABSTRACT

A process for preparing a porous sheet material, which comprises impregnating and/or coating on a substrate a water-in-oil type polyurethane emulsion (d) comprising a hydrophobic polyurethane (a), a hydrophilic polyurethane (b), and organic solvent (c) and water, and drying it, characterized in that said hydrophobic polyurethane (a) is a hydrophobic polyurethane dispersion (e) obtained by reacting a hydrophobic polyol, an organic diisocyanate and a chain extender is an organic solvent (c) which has a limited compatibility with water and in which the polyurethane thereby formed is substantially insoluble; said hydrophilic polyurethane (b) is a polyurethane containing about 20 to about 40% by weight, based on the total polymer, of polyoxyethylene groups; and the weight ratio of (a):(b) is about 90-99: about 10-1.

7 Claims, No Drawings

PROCESS FOR PREPARING A POROUS SHEET MATERIAL

BACKGROUND OF THE INVENTION

1. Field of the Invention

The present invention relates to a process for preparing a porous sheet material. Particularly, it relates to a process which is capable of providing a porous sheet material superior in its properties such as mechanical strength and steam permeability at a high level of productivity.

2. Description of the Prior Art

A number of processes have been known for the preparation of porous sheet materials, as substitutes for natural leathers, from polyurethanes. Such processes may be generally classified into wet processes and dry processes. Each type of processes has its own pros and cons. The dry processes are superior from the viewpoint of the productivity. As such dry processes, there may be mentioned, for instance, processes disclosed in Japanese Examined Patent Publication No. 18249/1980 and Japanese Unexamined Patent Publication No. 41063/1976. However, in these conventional processes, a relatively great amount of a hydrophilic polyurethane is used for the formation of the polyurethane layer, and accordingly, the mechanical properties and physicochemical properties of the sheet material thereby obtainable tend to be inadequate. Further, in the conventional processes, a cumbersome and time-consuming drying step constitutes a decisive drawback. It is naturally conceivable that the amount of the hydrophilic polyurethane be reduced to overcome this drawback. However, if the amount is so reduced, there will be other drawbacks (for instance, instability of the treating liquid).

The present inventors have found that it is possible to overcome the drawbacks of the conventional processes by employing a hydrophobic polyurethane dispersion prepared by a specific method, as the major component of the coating material, and using a small amount of a hydrophilic polyurethane containing polyoxyethylene groups in a specific proportion, as the emulsifier. The present invention is based on this discovery.

SUMMARY OF THE INVENTION

The present invention provides a process for preparing a porous sheet material, which comprises impregnating and/or coating on a substrate a water-in-oil type polyurethane emulsion (d) comprising a hydrophobic polyurethane (a), a hydrophilic polyurethane (b), an organic solvent (c), and water, and drying it. The process is characterized in that said hydrophobic polyurethane (a) is a hydrophobic polyurethane dispersion (e) obtained by reacting a hydrophobic polyol, an organic diisocyanate and a chain extender in an organic solvent (c) which has a limited compatibility with water and in which the polyurethane thereby formed is substantially insoluble; said hydrophilic polyurethane (b) is a polyurethane containing about 20 to about 40% by weight, based on the total polymer, of polyoxyethylene groups; and the weight ratio of (a):(b) is about 90–99:about 10–1.

Now, the present invention will be described in detail with reference to the preferred embodiments.

DESCRIPTION OF THE PREFERRED EMBODIMENTS

The hydrophobic polyurethane (a) to be used in the process of the present invention, is a material per se generally known. It is obtainable by reacting a hydrophobic polyol, an organic diisocyanate and a chain extender. As the hydrophobic polyol, there may be mentioned, for instance, polyethylene adipate, polyethylenepropylene adipate, polyethylenebutylene adipate, polydiethylene adipate, polybutylene adipate, polyethylene succinate, polybutylene succinate, polyethylene sebacate, polybutylene sebacate, polytetramethylene ether glycol, poly-ε-caprolactonediol, polyhexamethylene adipate, carbonate polyol, and polypropylene glycol which have terminal hydroxyl groups and a molecular weight of from 300 to 4000. As the organic diisocyanate, there may be mentioned 4,4'-diphenylmethanediisocyanate (MDI), hydrogenated MDI, isophorone diisocyanate, 1,3-xylylene diisocyanate, 1,4-xylylene diisocyanate, 2,4-tolylene diisocyanate, 2,6-tolylene diisocyanate, 1,5-naphthaline diisocyanate, m-phenylene diisocyanate and p-phenylene diisocyanate As the chain extender, there may be mentioned ethylene glycol, propylene glycol, diethylene glycol, 1,4-butanediol, 1,6-hexanediol, ethylenediamine, 1,2-propylenediamine, trimethylenediamine, tetramethylenediamine, hexamethylenediamine, decamethylenediamine, isophoronediamine, m-xylylenediamine, hydrazin and water.

The characteristic feature of the polyurethane (a) to be used in the present invention is that it is dispersed in a certain specific organic solvent in a very fine state, for instance, with a particle size of from about 0.1 to about 5 $\mu$m to form a dispersion (e). With such a composition, it is possible to obtain a water-in-oil type emulsion having superior stability simply by adding a small amount of an emulsifier (i.e. a polyurethane (b)), and it is thereby possible to obtain the effect intended by the present invention. The dispersion (e) is prepared by reacting the above-mentioned three components in an organic solvent (c) which does not substantially dissolve the polyurethane (a) and has a limited compatibility with water and which preferably has a boiling point of at most 120° C. under atmospheric pressure. The reaction conditions, for instance, the temperature and reaction time, may be the same as the conditions commonly employed in the conventional processes.

As the organic solvent (c) methylethyl ketone, methyl-n-propyl ketone, methylisobutyl ketone, diethyl ketone, methylformate, ethyleformate, propylformate, methylacetate, ethyleacetate, or butylacetate, is preferred. Further, acetone, cyclohexane, tetrahydrofuran, dioxane, methanol, ethanol, ispropylalchol, butanol, toluene, xylene, dimethylformamide, dimethylsulfoxide, perchloroethylene, trichloroethylene, methylcellosolve, butylcellosolve or cellosolveacetate may also be used. Among these organic solvents, those having no limitation in their compatibility with water or those which are totally insoluble in water, may be used in combination with other solvents so that the solvent mixture has a limited compatibility with water. The above-mentioned solvents may, of course, be used in proper combination as a solvent mixture. The dispersion (e) can be obtained by preparing the polyurethane (a) in such an organic solvent. The solid content is preferably adjusted to be within a range of from 5 to 60% by weight by adding the same or different solvent or removing the solvent.

It is believed that according to the present invention, the polyurethane (a) is not substantially dissolved in the organic solvent (c), but its particles are dispersed in a stabilized state with their surfaces affiliated with the solvent, whereby the effect of the present invention is obtainable.

The polyurethane (b) to be used in the present invention contains polyoxyethylene groups in an amount of from about 20 to about 40% by weight, based on the total amount of the polymer. It may be the one which is soluble in the organic solvent (c). Such a polyurethane (b) may be advantageously prepared in the same manner as in the preparation of the above-mentioned polyurethane (a) except that a part of the above-mentioned hydrophobic polyol is substituted by polyethylene glycol or other substances having a similar effectiveness, to obtain its solution in the organic solvent (c). It may be prepared in a manner different from the manner for the preparation of the above-mentioned polyurethane (a). However, it is economically advantageous to employ the former method.

The above-mentioned polyurethane (b) is added to the above-mentioned polyurethane dispersion (d) by itself or as its solution in an organic solvent in a weight ratio (solid contents) of a:b=about 90-99:about 10-1. If the amount of the polyurethane (b) exceeds about 10% by weight, the stability of the dispersion will be improved, but the drying step, which will be described hereinafter, will be cumbersome and the physical properties of the sheet material thereby obtained tend to be inferior. On the other hand, if the amount of the polyurethane (b) is less than about 1% by weight, the stability of the emulsion tends to be abruptly lowered, whereby the practical usefulness will be lost. Further, for some reasons which are not clearly understood, the effect of the present invention can not be adequately obtained in a case where the amount of the polyoxyethylene groups in the above-mentioned polyurethane (b) is less than about 20% by weight and the amount of the polyurethane (b) is more than about 10% by weight, or a case where the amount of the polyoxyethylene groups in the polyurethane (b) is greater than 40% by weight and the amount of the polyurethane (b) is less than about 1% by weight. In this dispersion of the mixture, the polyurethane (a) is in a dispersed state and the polyurethane (b) is in a dissolved state, whereby the total amount of the solid contents is from about 5 to about 60% by weight.

The polyurethane emulsion (d) to be used in the present invention can be obtained by intensively stirring the above-mentioned dispersion of the mixture and adding water thereto in an amount not greater than the amount required for saturation, for instance, water in an amount of from about 50 to about 500 parts by weight per 100 parts by weight of the solid contents in the dispersion of the mixture. The emulsion thus obtained is a milk-white creamy fluid which can be stored in a stabilized condition for a few months. Various conventional additives such as a coloring agent, a cross-linking agent, a stabilizer, a filler or the like may optionally be added to this emulsion, as the case requires.

As the substrate to be used in the present invention, any substrates such as various types of woven fabrics, knitted fabrics non-woven fabrics, release papers, plastic films, metal sheets or glass sheets. The application of the above-mentioned emulsion to the substrate may be conducted in any known methods such as a coating method, an impregnation method or a combination of these methods. The coating and/or impregnating amount thereof may be varied within a wide range of e.g. from about 5 to about 2000 gm (solid contents/m$^2$ depending on the particular purpose.

The drying step in the process of the present invention can be completed in a very short period of time without requiring any cumbersome treatment. In a dry process like the process of the present invention, this drying step constitutes a decisive and controlling step for the productivity. Therefore, the drying operation which can be completed in a short period of time is extremely advantageous as compared with the conventional processes. Namely, the coated and/or impregnated substrate can simply be dried at a temperature of from about 60° to about 100° C. for about 1 to about 3 minutes and at a temperature of from about 100° to about 150° C. for about 1 to about 3 minutes without requiring a solidifying step as disclosed in Japanese Unexamined Patent Publication No. 41063/1976, whereby a porous sheet material of the present invention can readily be obtained. The reason why the drying operation can be completed in such a short period of time, is believed to be such that the hydrophobic polyurethane (a) used as a coating film-forming agent in the present invention constitutes at least 90% weight of the total polyurethane and it is present in the form of fine particles from the bigining to the end, whereby its particles are dispersed and emulsified with water in a stabilized condition by means of a small amount of a surfactant (i.e. the polyurethane (b), and when dried, they swiftly and readily contact water for gelation by the evaporation of the organic solvent.

The porous sheet materials obtained by the present invention have a very fine porous structure and thus have superior physical properties and excellent steam permeability, whereby they are useful as base materials for various artificial leathers, which may be used for clothings, shoes, water-proof fabrics, tents, wall materials, floor materials, filter materials or filters for air-conditioners.

The present invention will be described in further detail with reference to Examples. In the Examples, "parts" and "%" mean "parts by weight" and "% by weight", respectively.

EXAMPLES 1 TO 6

(Preparation of hydrophobic and hydrophilic polyurethanes)

1. 1000 Parts of polytetramethylene glycol (average molecular weight: about 1000, hydroxyl group value: 112), 93 parts of ethylene-glycol and 625 g of diphenylmethane diisocyanate were added to 1500 parts of methylethyl ketone and reacted at 60° C. for 8 hours, and then 2500 parts methylethyl ketone was added. The mixture was cooled under stirring to a normal temperature, whereupon a milk-white polyurethane dispersion (1) having a solid content of 30% was obtained.

2. 1000 Parts of 1,4-butaneethylene adipate (average molecular weight: about 1000, hydroxyl group value: 112), 140 parts of 1,4-butanediol, 1140 parts of methylethyl ketone and 650 parts of diphenylmethane diisocyanate were reacted at 70° C. for 8 hours, and then 3042 parts of methylethyl ketone was added and homogeneously mixed. The mixture was cooled to a normal temperature under stirring, whereupon a milk-white polyurethane dispersion (2) having a solid content of 30% was obtained.

3. 1000 Parts of 1,6-hexamethylene adipate (average molecular weight: 2000, hydroxyl group value: 56), 125 parts of 1,4-butandiol and 472 parts of diphenylmethane diisocyanate were added to 1200 parts of methylethyl ketone and reacted at 70° C. for 8 hours, and then 2526 parts of methylethyl ketone was further added and homogeneously mixed. The mixture was cooled to normal temperature under stirring, whereupon a milk-white polyurethane dispersion (3) having a solid content of 30% was obtained. 4. 4000 Parts of polypropylene glycol (average molecular weight: about 2000, hydroxyl group value: 56) and 750 parts of diphenylmethane diisocyanate were reacted at 80° C. for 3 hours, and then 2000 parts of methylethyl ketone was added. The reaction system was adequately homogeneously mixed, and 2000 parts of polyethylene glycol (molecular weight: about 1000, hydroxyl group value: 112) was added thereto. The mixture was reacted at 75° C. for 5 hours, and then 2500 parts of methylethyl ketone was additionally added. The mixture was homogeneously stirred, whereupon a polyurethane solution (4) having a solid content of 60% and a polyethylene glycol content of about 29.6% was obtained.

5. 4000 Parts of 1,4-butaneethylene adipate (average molecular weight: 2000, hydroxyl group value: 56) and 786 parts of hydrogenated diphenylmethane diisocyanate were reacted at 110° C. for 4 hours, and then 1500 parts of methylethyl ketone was added thereto. The mixture was adequately homogeneously mixed. To this solution, 1400 parts of polyethylene glycol (average molecular weight: about 700, hydroxyl group value: 160) was added and reacted at 80° C. for 10 hours, and then 2624 parts of methylethyl ketone was added. The mixture was stirred until a homogeneous mixture was obtained, whereby a polyurethane solution (5) having a solid content of 60% and a polyethylene glycol content of 22.6% was obtained.

6. 6000 Parts of polytetramethylene glycol (average molecular weight: about 2000, hydroxyl group value: 56) and 750 parts of diphenylmethane diisocyanate were reacted at 80° C. for 3 hours, and then 2000 parts of methylethyl ketone was added. The mixture was adequately homogeneously mixed. To this solution, 3000 parts of polyethylene glycol (average molecular weight: about 1500, hydroxyl group value: 75) was added and reacted at 75° C. for 5 hours, and then 3167 parts of methylethyl ketone was further added. The mixture was homogeneously mixed, whereupon a polyurethane solution (6) having a solid content of 60% and a polyethylene glycol content of 38.7% was obtained.

EXAMPLES 7 TO 12

(Preparation of polyurethane emulsions)

The products of Examples 1 to 6 were respectively mixed with an organic solvent and water by means of a homo-mixer, whereby polyurethane W/O emulsions having the following compositions were prepared.

| | | |
|---|---|---|
| 7. Polyurethane dispersion (1) | 100 parts | |
| Polyurethane solution (4) | 4 parts | |
| Methylethyl ketone | 20 parts | Polyurethane |
| Toluene | 20 parts | emulsion (7) |
| Water | 80 parts | |
| 8. Polyurethane dispersion (1) | 100 parts | |
| Polyurethane solution (5) | 5 parts | |
| Dioxane | 10 parts | |
| Toluene | 10 parts | Polyurethane |
| Xylene | 20 parts | emulsion (8) |
| Water | 60 parts | |
| 9. Polyurethane dispersion (2) | 100 parts | |
| Polyurethane solution (5) | 3 parts | |
| Methylethyl ketone | 20 parts | Polyurethane |
| Xylol | 20 parts | emulsion (9) |
| Water | 75 parts | |
| 10. Polyurethane dispersion (2) | 100 parts | |
| Polyurethane solution (6) | 2 parts | |
| Tetrahydrofuran | 20 parts | Polyurethane |
| Xylene | 20 parts | emulsion (10) |
| Water | 80 parts | |
| 11. Polyurethane dispersion (3) | 100 parts | |
| Polyurethane solution (6) | 5 parts | |
| Methylethyl ketone | 20 parts | Polyurethane |
| Methylisobutyl ketone | 20 parts | emulsion (11) |
| Water | 79 parts | |
| 12. Polyurethane dispersion (3) | 100 parts | |
| Polyurethane solution (4) | 4 parts | |
| Ethylacetate | 20 parts | Polyurethane |
| Methylethyl ketone | 150 parts | emulsion (12) |
| Water | 80 parts | |

COMPARATIVE EXAMPLES 1 TO 2

(Preparation of polyurethane emulsions)

| | | |
|---|---|---|
| 1. Polyurethane dispersion (1) | 100 parts | |
| Polyurethane solution (4) | 0.3 parts | |
| Methylethyl ketone | 20 parts | Polyurethane |
| Toluene | 20 parts | emulsion (13) |
| Water | 80 parts | |
| 2. Polyurethane dispersion (1) | 100 parts | |
| Polyurethane solution (4) | 10 parts | |
| Methylethyl ketone | 20 parts | Polyurethane |
| Toluene | 20 parts | emulsion (14) |
| Water | 80 parts | |

The properties of the above-mentioned polyurethane emulsions (7) to (14) are as shown in Table 1.

TABLE 1

| Emulsions | Viscosity | Stability | Solid contents | b/a |
|---|---|---|---|---|
| 7 | 20,000 (cps) | No change for one month or more | 14.5 (%) | 92.6/7.4 |
| 8 | 14,000 | No change for one month or more | 16.0 | 90.9/9.1 |
| 9 | 25,000. | No change for one month or more | 14.6 | 94.3/5.7 |
| 10 | 23,000 | No change for one month or more | 14.1 | 96.2/3.8 |
| 11 | 31,000. | No change for one month or more | 15.3 | 90.9/9.1 |
| 12 | 110 | No change for one month or more | 9.2 | 92.6/7.4 |
| 13 | 15,000 | Phase separation in 2 hours | 13.7 | 99.4/0.6 |
| 14 | 22,000 | No change for one month or more | 15.7 | 83.3/16.7 |

*In the above Table b/a is the hydrophobic polyurethane/hydrophilic polyurethane.

EXAMPLES 13 TO 19 AND COMPARATIVE EXAMPLE 20

The emulsions (7) to (14) shown in Table 1 were coated (or impregnated) on various substrates and dried to obtain various porous sheet materials of the present invention and the Comparative Example.

TABLE 2

| | | | (production conditions) | |
|---|---|---|---|---|
| Examples | Emulsions | Substrates | Coated (or impregnated) amounts (g/m$^2$) | Drying conditions |
| 13 | 7 | Release paper | 200 (coated) | 80° C. for 2 min. + 125° C. for 2 min. |
| 14 | 7 | Nylon taffeta | 600 (coated) | 80° C. for 2 min. + 125° C. for 2 min. |
| 15 | 8 | Cotton fabric | 400 (coated) | 80° C. for 2 min. + 125° C. for 2 min. |
| 16 | 9 | T/R Raised fabric | 800 (coated) | 80° C. for 3 min. + 140° C. for 3 min. |
| 17 | 10 | Cotton fabric | 300 (coated) | 80° C. for 2 min. + 125° C. for 2 min. |
| 18 | 11 | Tetlon taffeta | 500 (coated) | 80° C. for 2 min. + 125° C. for 2 min. |
| 19 | 12 | Non-woven fabric | 1000 (impregnated) | 90° C. for 3 min. + 140° C. for 3 min. |
| 20 (Comparative exmp) | 14 | Release paper | 200 (coated) | 80° C. for 2 min. + 125° C. for 2 min. |

TABLE 3

| | | (characteristics of sheets) | | | |
|---|---|---|---|---|---|
| Examples | Outer appearance | Apparent specific gravity (g/cm$^3$) | Thickness | Moisture permeability (g/m$^2$/24 hrs.) (JIS Z 0208 B) | Internal porous Structure |
| 13 | White | 0.452 | 64 | 3,750 | Uniformly fine |
| 14 | " | 0.515 | 169 | 3,450 | Uniformly fine |
| 15 | " | 0.594 | 108 | 3,210 | Uniformly fine |
| 16 | " | 0.538 | 217 | 3,160 | Uniformly fine |
| 17 | " | 0.623 | 67 | 2,870 | Uniformly fine |
| 18 | " | 0.506 | 151 | 3,560 | Uniformly fine |
| 19 | " | — | — | 2,650 | Uniformly fine |
| 20 | Translucent | 0.892 | 35 | 150 | No porous sheet was obtainable |

Having thus described the present invention, it should be understood that according to the process of the present invention, porous sheet materials having superior physical properties can be produced efficiently in the extremely short period of time for the drying treatment.

We claim:

1. A process for preparing a porous sheet material, which comprises:

(1) impregnating and/or coating on a substrate a water-in-oil type polyurethane emulsion (d) comprising a hydrophobic polyurethane (a), a hydrophilic polyurethane (b), an organic solvent (c) and water; said process characterized in that said hydrophobic polyurethane (a) is a hydrophobic polyurethane dispersion (e) obtained by reacting a hydrophobic polyol, an organic diisocyanate and a chain extender in an organic solvent (c) which has a limited compatibility with water and in which the polyurethane thereby formed is substantially insoluble; said hydrophilic polyurethane (b) is a polyurethane containing about 20 to about 40% by weight, based on the total polymer, of polyoxyethylene groups; and the weight ratio of (a):(b) is about 90–99:about 10–1; and (2) drying at a temperature of 60° to 100° C. for about 1 to 3 minutes and 100° to 150° C. for about 1 to 3 minutes.

2. The process according to claim 1, wherein the hydrophobic polyol is selected from the group consisting of polyethylene adipate, polyethylenepropylene adipate, polyethylenebutylene adipate, polydiethylene adipate, polybutylene adipate, polyethylene succinate, polybutylene succinate, polyethylene sebacate, polybutylene sebacate, polytetramethylene ether glycol, poly-ε-caprolactonediol, polyhexamethylene adipate, carbonate polyol, and polypropylene glycol, which have terminal hydroxyl groups and a molecular weight of from 300 to 4000.

3. The process according to claim 1, wherein the organic diisocyanate is selected from the group consisting of 4,4-diphenyl-methane-diisocyanate (MDI), hydrogenated MDI, isophorone diisocyanate, 1,3-xylylene diisocyanate, 1,4-xylylene diisocyanate, 2,4-tolylene diisocyanate, 2,6-tolylene diisocyanate, 1,5-naphthaline diisocyanate, m-phenylene diisocyanate and p-phenylene diisocyanate.

4. The process according to claim 1, wherein the chain extender is selected from the group consisting of ethylene glycol, propylene glycol, diethylene glycol, 1,4-butanediol, 1.6-hexanediol, ethylenediamine, 1,2-propylenediamine, trimethylenediamine, tetramethylenediamine, hexamethylenediamine, decamethylenediamine, isophoronediamine, m-xylylenediamine, hydrazin and water.

5. The process according to claim 1, wherein the hydrophobic polyurethane particles in the hydrophobic polyurethane dispersion (e) have a particle size of from about 0.1 to about 5 μm.

6. The process according to claim 1, wherein the organic solvent (c) is selected from the group consisting of methylethyl ketone, methyl-n-propyl ketone, methylisobutyl ketone, diethyl ketone, methylformate, ethyleformate, propylformate, methylacetate, ethyleacetate, butylacetate, acetone, cyclohexane, tetrahydrofuran, dioxane, methanol, ethanol, isopropylalchol, butanol, toluene, xylene, dimethylformamide, dimethylsulfoxide, perchloroethylene, trichloroethylene, methylcellosolve, butylcellosolve and cellosolveacetate.

7. The process according to claim 1, wherein the hydrophobic polyurethane dispersion (e) has a solid content of from 5 to 60% by weight.

* * * * *